US009761141B2

(12) United States Patent
Kawagoe

(10) Patent No.: US 9,761,141 B2
(45) Date of Patent: Sep. 12, 2017

(54) AUTOMATIC DRIVING CONTROL SYSTEM AND AUTOMATIC DRIVING CONTROL METHOD

(71) Applicant: Mitsubishi Electric Corporation, Tokyo (JP)

(72) Inventor: Tomoya Kawagoe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/698,098

(22) Filed: Apr. 28, 2015

(65) Prior Publication Data

US 2016/0124432 A1 May 5, 2016

(30) Foreign Application Priority Data

Oct. 30, 2014 (JP) ................................ 2014-221007

(51) Int. Cl.
*G01C 22/00* (2006.01)
*G05D 1/00* (2006.01)
*G08G 1/16* (2006.01)

(52) U.S. Cl.
CPC .................................. *G08G 1/162* (2013.01)

(58) Field of Classification Search
CPC ..... G05D 1/0088; G05D 1/0289; G08G 1/162
USPC ........................................................ 701/24
See application file for complete search history.

(56) References Cited

U.S. PATENT DOCUMENTS 8,219,028 B1 * 7/2012 Flamholz .............. G06F 1/1694 455/41.2
2007/0293996 A1 * 12/2007 Mori .................... G01C 21/005 701/23
2012/0053733 A1 * 3/2012 Kani ...................... G05B 19/19 700/275

OTHER PUBLICATIONS

"Automatic Driving", MotorFun Illustrated, Nov. 15, 2013, vol. 86, San-ei Shobo Publishing Co., Ltd.

* cited by examiner

*Primary Examiner* — Calvin Cheung
*Assistant Examiner* — Paula L Schneider
(74) *Attorney, Agent, or Firm* — Sughrue Mion, PLLC; Richard C. Turner

(57) ABSTRACT

Provided are an automatic driving control system and an automatic driving control method that are capable of clearing away suspicion of a foul by exchanging a "hand" for determining priority of passage by a fair method that allows no foul when automatically driven vehicles face each other on a road. When the automatically driven vehicles face each other on the road, the "hand" for determining the priority of passage is exchanged by performing transmission/reception two times by use of a composite number of prime numbers each having a large number of digits.

6 Claims, 3 Drawing Sheets

AUTOMATIC DRIVING CONTROL SYSTEM AND AUTOMATIC DRIVING CONTROL METHOD

BACKGROUND OF THE INVENTION

1. Field of the Invention

The present invention relates to an automatic driving control system and an automatic driving control method for determining priority of passage through vehicle-to-vehicle communications when automatically driven vehicles face each other on a road.

2. Description of the Related Art

In recent years, technologies for automatic driving of a vehicle have been actively developed (see, for example, "MotorFun illustrated VOL. 86 Special Feature: Automatic Driving", San-ei Shobo Publishing Co., Ltd, Nov. 15, 2013 (hereinafter referred to as "Non-patent Literature 1")). In the automatic driving of a vehicle, for example, when automatically driven vehicles face each other on a narrow road, it is necessary for both automatic driving control systems mounted to the vehicles to determine priority indicating which of the vehicles is to pass the road first.

At this time, both the vehicles cannot simultaneously pass the narrow road when both prioritize themselves, and on the other hand, when both prioritize another party, neither of the vehicles starts to travel, failing to pass the road. Such a situation can happen even if any improvements are made to decision criteria of the automatic driving control system or accuracy of a camera or the like for providing information.

As a method of solving such a problem, it is conceivable that the automatic driving control systems of the vehicles play "rock-scissors-paper" or the like with each other, and that the priority of passage is determined based on a win-loss outcome thereof. For example, in a case of using "rock-scissors-paper", a "hand" selected from the group consisting of "rock", "scissors", and "paper" is exchanged simultaneously with each other by using vehicle-to-vehicle communications, and the priority of the passage is determined based on the win-loss outcome obtained from one's own "hand" and the other's "hand".

However, a delay occurs in actual vehicle-to-vehicle communications, and hence the "hand" for determining the priority of passage cannot be transmitted/received completely simultaneously. As a result, there is a problem in that one party that first transmitted the "hand" cannot clear away suspicion of a foul conducted by the another party waiting to see the former party's "hand" before showing the latter's own "hand" (hereinafter referred to simply as "foul"), that is, suspicion against the another party transmitting the "hand" later that the another party transmitted the "hand" advantageous thereto after seeing the "hand" of the former party.

SUMMARY OF THE INVENTION

The present invention has been made in view of the above-mentioned problem, and an object thereof is to provide an automatic driving control system and an automatic driving control method that are capable of clearing away suspicion of a foul by controlling automatically driven vehicles to exchange a "hand" for determining priority of passage when facing each other on a road by a fair method inhibiting the foul.

According to one embodiment of the present invention, there is provided an automatic driving control system for a vehicle, including: a control operation part for determining, when automatically driven vehicles of an own vehicle and another vehicle face each other on a road, priority of passage by exchanging a "hand" through a communication device for performing vehicle-to-vehicle communications provided to the vehicle, the control operation part of the own vehicle being configured to: as first transmission/reception: multiply a prime number 1 indicating the "hand" of the own vehicle by a prime number 2 that is different from the prime number 1 and unknown to the another vehicle, and transmit a result thereof to the another vehicle as (first composite number)=(prime number 1)×(prime number 2); and receive, from the another vehicle, (second composite number)=(prime number 3)×(prime number 4) obtained by multiplying a prime number 3 indicating a "hand" of the another vehicle by a prime number 4 that is different from the prime number 3 and unknown to the own vehicle; as second transmission/reception: multiply the second composite number received in the first transmission/reception by the prime number 2, and transmit a result thereof to the another vehicle as (third composite number)=(prime number 3)×(prime number 4)×(prime number 2); and receive, from the another vehicle, (fourth composite number)=(prime number 1)×(prime number 2)×(prime number 4) obtained by multiplying the first composite number transmitted in the first transmission/reception by the prime number 4; as processing for acquiring the "hand": acquire, from the first composite number and the second composite number transmitted/received in the first transmission/reception and the fourth composite number received in the second transmission/reception, the prime number 3 indicating the "hand" of the another vehicle by an arithmetic operation: (first composite number)×(second composite number)/(fourth composite number)=((prime number 1)×(prime number 2))×((prime number 3)×(prime number 4))/((prime number 1)×(prime number 2)×(prime number 4))=(prime number 3); and allow the another vehicle to acquire, from the first composite number and the second composite number transmitted/received in the first transmission/reception and the third composite number received in the second transmission/reception, the prime number 1 indicating the "hand" of the own vehicle by an arithmetic operation: (first composite number)×(second composite number)/(third composite number)=((prime number 1)×(prime number 2))×((prime number 3)×(prime number 4))/((prime number 3)×(prime number 4)×(prime number 2))=(prime number 1); and as processing for determining the priority, determine the priority of passage between the own vehicle and the another vehicle based on a win-loss outcome obtained from the prime number 3 indicating the "hand" of the another vehicle acquired in the processing for acquiring the "hand" and the prime number 1 indicating the "hand" of the own vehicle; and the prime number 1, the prime number 2, the prime number 3, and the prime number 4 have such numbers of digits as to inhibit a central processing unit that forms the control operation part from performing prime factorization for the first composite number and the second composite number within a time period until the second transmission/reception is performed after the first transmission/reception is performed.

According to one embodiment of the present invention, there is provided an automatic driving control method to be used for an automatic driving control system for a vehicle including a control operation part for determining, when automatically driven vehicles of an own vehicle and another vehicle face each other on a road, priority of passage by exchanging a "hand" through a communication device for performing vehicle-to-vehicle communications provided to the vehicle, the automatic driving control method including, by the control operation part of the own vehicle: as a first transmission/reception step: multiplying a prime number 1 indicating the “hand” of the own vehicle by a prime number 2 that is different from the prime number 1 and unknown to the another vehicle, and transmit a result thereof to the another vehicle as (first composite number)=(prime number 1)×(prime number 2); and receiving, from the another vehicle, (second composite number)=(prime number 3)×(prime number 4) obtained by multiplying a prime number 3 indicating a “hand” of the another vehicle by a prime number 4 that is different from the prime number 3 and unknown to the own vehicle; as a second transmission/reception step: multiplying the second composite number received in the first transmission/reception step by the prime number 2, and transmitting a result thereof to the another vehicle as (third composite number)=(prime number 3)×(prime number 4)×(prime number 2); and receiving, from the another vehicle, (fourth composite number)=(prime number 1)×(prime number 2)×(prime number 4) obtained by multiplying the first composite number transmitted in the first transmission/reception step by the prime number 4; as a step of acquiring the “hand”: acquiring, from the first composite number and the second composite number transmitted/received in the first transmission/reception step and the fourth composite number received in the second transmission/reception step, the prime number 3 indicating the “hand” of the another vehicle by an arithmetic operation: (first composite number)×(second composite number)/(fourth composite number)=((prime number 1)×(prime number 2))×((prime number 3)×(prime number 4))/((prime number 1)×(prime number 2)×(prime number 4))=(prime number 3); and allowing the another vehicle to acquire, from the first composite number and the second composite number transmitted/received in the first transmission/reception step and the third composite number received in the second transmission/reception step, the prime number 1 indicating the “hand” of the own vehicle by an arithmetic operation: (first composite number)×(second composite number)/(third composite number)=((prime number 1)×(prime number 2))×((prime number 3)×(prime number 4))/((prime number 3)×(prime number 4)×(prime number 2))=(prime number 1); and as a step of determining the priority, determining the priority of passage between the own vehicle and the another vehicle based on a win-loss outcome obtained from the prime number 3 indicating the “hand” of the another vehicle acquired in the step of acquiring the “hand” and the prime number 1 indicating the “hand” of the own vehicle, in which the prime number 1, the prime number 2, the prime number 3, and the prime number 4 have such numbers of digits as to inhibit a central processing unit that forms the control operation part from performing prime factorization for the first composite number and the second composite number within a time period until the second transmission/reception step is performed after the first transmission/reception step is performed.

The automatic driving control system according to one embodiment of the present invention is configured to transmit/receive the “hand” for determining the priority of passage by using a composite number of prime numbers having large numbers of digits when automatically driven vehicles face each other on a road. As a result, it is possible to obtain the automatic driving control system and the automatic driving control method that are capable of clearing away suspicion of a foul by causing the automatically driven vehicles to exchange a “hand” by a fair method inhibiting the foul.

DETAILED DESCRIPTION OF THE PREFERRED EMBODIMENT

Figure 1:
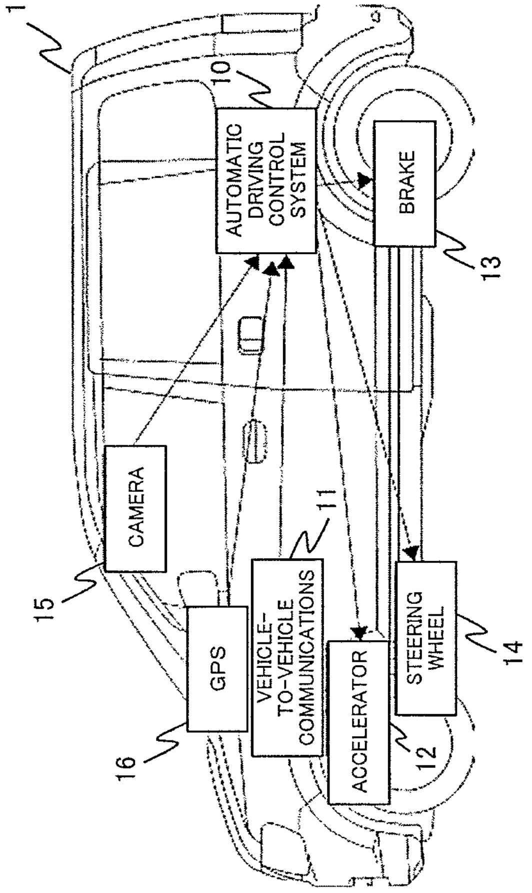
FIG. 1 is a schematic diagram illustrating a configuration of a vehicle including an automatic driving control system according to a first embodiment of the present invention.

Now, an automatic driving control system and an automatic driving control method according to an exemplary embodiment of the present invention are described with reference to the drawings. Note that, in the drawings, the same reference symbols represent the same or corresponding parts.

First Embodiment

FIG. 1 is a schematic diagram illustrating a configuration of a vehicle 1 including an automatic driving control system 10 according to a first embodiment of the present invention. The “automatic driving” represents that, as illustrated in FIG. 1, a control operation part (not shown) of the automatic driving control system 10 mounted to the vehicle 1 performs the following processing of the “recognition”, “decision”, and the “actuation” in place of a driver of the vehicle 1 (see, for example, p. 33 of Non-patent Literature 1).

“Recognition” is to grasp road conditions by performing image recognition or the like based on information received from a camera 15, a GPS 16, and the like provided to the vehicle 1 (see, for example, p. 69 of Non-patent Literature 1).

“Decision” is to determine how to operate the vehicle 1 based on a result of the “recognition”.

“Actuation” is to actuate an accelerator 12, a brake 13, and a steering wheel 14 based on a result of the “decision”.

Further, when including a communication device 11 for performing vehicle-to-vehicle communications, a plurality of vehicles 1 close to each other can also exchange the results of the “recognition” and the “decision” with each other.

Figure 2:
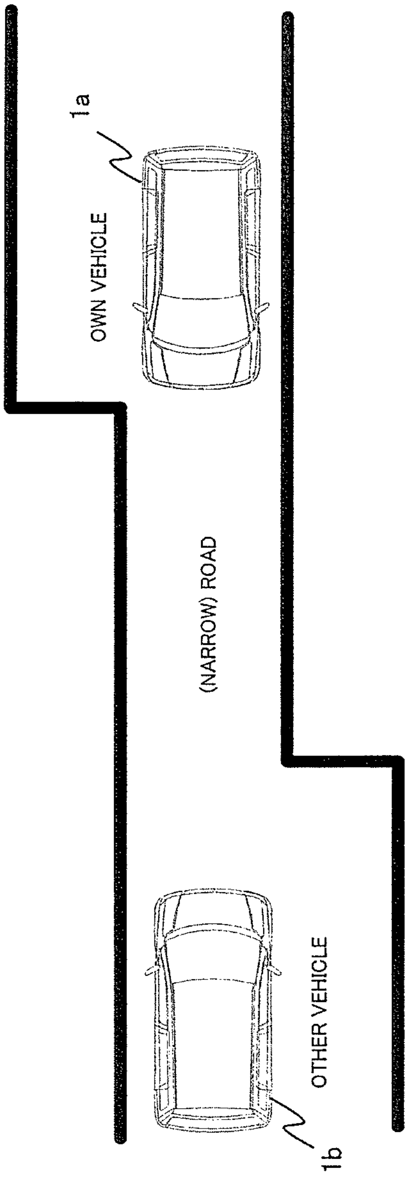
FIG. 2 is an explanatory diagram illustrating a situation in which vehicles each being automatically driven by the automatic driving control system according to the first embodiment of the present invention face each other on a road.

FIG. 2 is an explanatory diagram illustrating a situation in which vehicles 1 each being automatically driven by the automatic driving control system 10 according to the first embodiment of the present invention face each other on a road. In the automatic driving, various situations such as overtaking, passage through an intersection, and the like are assumed (see, for example, p. 39 of Non-patent Literature 1).

As one of such situations, there is also a situation in which, as illustrated in FIG. 2, when the automatically driven vehicles 1 of an own vehicle 1*a* and another vehicle 1*b* face each other on a narrow road, the automatic driving control system 10 mounted to the vehicle 1 is used to "decide" priority indicating which of the vehicles 1 is to pass the road first.

Note that, FIG. 2 illustrates a case where the own vehicle 1*a* has reached the narrow road earlier than the another vehicle 1*b*. In such a case, the automatic driving control system 10 of the vehicle 1 uses the control operation part to determine the priority indicating which of the own vehicle 1*a* and the another vehicle 1*b* is to pass the road first based on positions of the own vehicle 1*a* and the another vehicle 1*b* recognized by using the camera 15, the GPS 16, and the like and based on a time at which the another vehicle 1*b* was recognized.

Specifically, the automatic driving control system 10 of the own vehicle 1*a* "recognizes" that the own vehicle 1*a* has reached the narrow road first, and "decides" that the own vehicle 1*a* should pass the road first. On the other hand, the automatic driving control system 10 of the another vehicle 1*b* "recognizes" that the another vehicle 1*b* has reached the narrow road later, and "decides" that the another vehicle 1*b* should pass the narrow road later.

As a result of exchanging this "decision" between the own vehicle 1*a* and the another vehicle 1*b*, there is an agreement in the "decision" on the priority of both the own vehicle 1*a* and the another vehicle 1*b*, and hence, both the own vehicle 1*a* and the another vehicle 1*b* can pass the narrow road in order by "actuating" the respective vehicles 1 so that the own vehicle 1*a* is to pass the road first.

In this manner, when timings at which the own vehicle 1*a* and the another vehicle 1*b* reached the narrow road are different, there is an agreement in the "decision" on the priority of both the own vehicle 1*a* and the another vehicle 1*b*, and hence, both the vehicles 1 can pass the narrow road in order.

Figure 3:
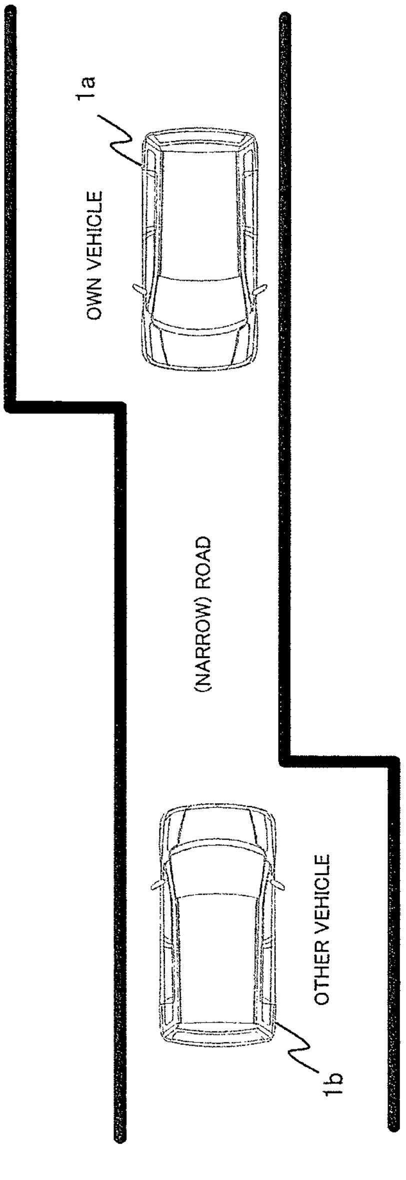
FIG. 3 is an explanatory diagram illustrating a situation in which vehicles each being automatically driven by the automatic driving control system according to the first embodiment of the present invention face each other simultaneously on a road.

FIG. 3 is an explanatory diagram illustrating a situation in which vehicles 1 each being automatically driven by the automatic driving control system 10 according to the first embodiment of the present invention face each other simultaneously on a road. On the other hand, as illustrated in FIG. 3, when the own vehicle 1*a* and the another vehicle 1*b* that are automatically driven reach the narrow road simultaneously, the decision made by the automatic driving control system 10 may differ between the own vehicle 1*a* and the another vehicle 1*b* due to an error in the "recognition" of the road conditions obtained by sensors of the camera 15, the GPS 16, and the like.

Even when the decision on the priority of passage between the vehicles 1 differs in the above-mentioned situation, in a case where both the own vehicle 1*a* and the another vehicle 1*b* include the communication device 11 for performing vehicle-to-vehicle communications, the automatic driving control systems 10 of the vehicles 1 can exchange, for example, "hands" of "rock-scissors-paper" with each other to determine the priority of passage based on a win-loss outcome obtained therefrom.

However, as described above, in actuality, the "hands" for determining the priority of passage cannot be transmitted/received completely simultaneously, which raises a problem in that both parties cannot clear away suspicion of a foul against each other.

Therefore, in the first embodiment, when the automatically driven vehicles 1 simultaneously face each other on the road, the "hand" for determining the priority of passage is transmitted/received by using a composite number formed of a product of prime numbers having large numbers of digits. As a result, the "hands" can be exchanged with each other by a method that guarantees such fairness as to allow no foul.

Specifically, by use of such property that prime factorization of the composite number of the prime numbers having large numbers of digits is difficult, the another vehicle 1*b* and the own vehicle 1*a* are configured to acquire the another party's "hand" only after transmission/reception of the "hand" is performed two times. That is, the own vehicle 1*a* and the another vehicle 1*b* can neither know the another party's "hand" each other at a time point when the first transmission/reception is performed, and can know the another party's "hand" for the first time at a time point when the second transmission/reception is performed.

Here, in the second transmission/reception, the result of the first transmission/reception is used, which inhibits the another vehicle 1*b* and the own vehicle 1*a* from changing the "hands" after the first transmission/reception. This allows the "hands" to be exchanged with each other by the method that guarantees such fairness as to allow no foul.

Figure 4:
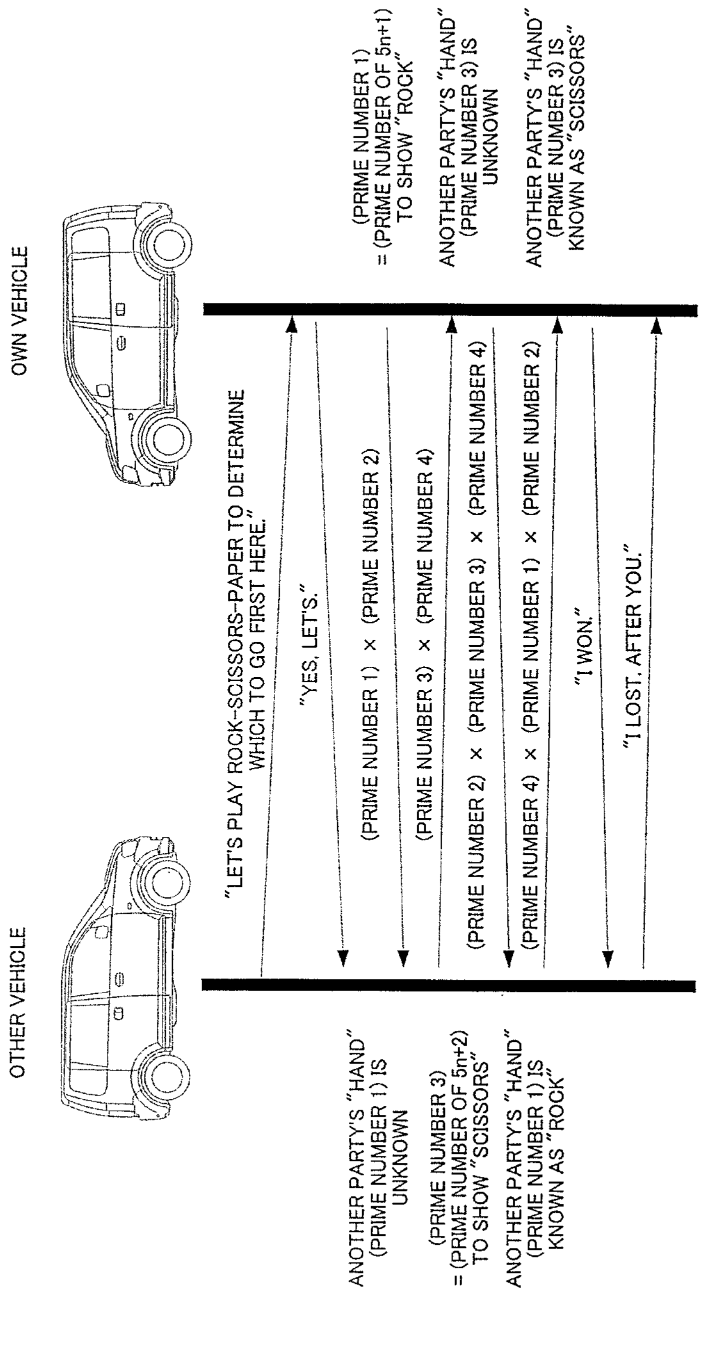
FIG. 4 is a sequence diagram illustrating an automatic driving control method performed by the automatic driving control system according to the first embodiment of the present invention.

FIG. 4 is a sequence diagram illustrating an automatic driving control method performed by the automatic driving control system 10 according to the first embodiment of the present invention. With reference to FIG. 4, a specific description is made below of the automatic driving control method performed by the automatic driving control system 10.

Indicating "hands" as prime numbers:

First, the control operation part of the automatic driving control system 10 of the own vehicle 1*a* prepares a prime number 1 indicating the "hand" of the own vehicle 1*a* and a prime number 2 that is different from the prime number 1 and unknown to the another vehicle 1*b*.

Further, in the same manner, the control operation part of the automatic driving control system 10 of the another vehicle 1*b* prepares a prime number 3 indicating the "hand" of the another vehicle 1*b* and a prime number 4 that is different from the prime number 3 and unknown to the own vehicle 1*a*.

Here, the prime number 1, the prime number 2, the prime number 3, and the prime number 4 use numbers each having such a number of digits as to cause the prime factorization of the composite number expressed by the product thereof to be difficult to a central processing unit that forms the control operation part of the automatic driving control system 10. More specific conditions for the number of digits are described later.

Subsequently, the control operation part of the automatic driving control system 10 of the own vehicle 1*a* assigns the prime number 1 to a prime number $p_i$ expressed by Expression (1) so that, for example, a remainder obtained by dividing $p_i$ by a natural number q becomes a value $r_i$ indicating the "hand".

$$p_i = q \times n_i + r_i \text{ (where } n_i \text{ represents a natural number)} \quad (1)$$

Further, in the same manner, the prime number 2 is assigned to the prime number $p_i$ expressed by Expression (1) so that the remainder obtained by dividing $p_i$ by the natural number q becomes a remainder $r_i$ different from the "hand".

Specifically, for example, when a "three-deadlock" rule such as "rock-scissors-paper" is used as a determination method for the win-loss outcome of the "hand", the control operation part of the own vehicle 1*a* assigns $p_1=5n_1+1$, $p_2=5n_2+2$, and $p_3=5n_3+3$ to "rock", "scissors", and "paper", respectively, as the prime number 1 indicating the "hand" of the own vehicle 1*a*. Then, as the prime number 2, $p_4=5n_4+4$ is assigned.

Similarly, the control operation part of the automatic driving control system 10 of the another vehicle 1*b* assigns the prime number 3 to a prime number $p_j$ expressed by Expression (2) so that, for example, a remainder obtained by dividing $p_j$ by the natural number q becomes a value $r_j$ indicating the "hand".

$$p_j = q \times m_j + r_j \text{ (where } m_j \text{ represents a natural number)} \quad (2)$$

Further, in the same manner, the prime number 4 is assigned to the prime number $p_j$ expressed by Expression (2) so that the remainder obtained by dividing $p_j$ by the natural number q becomes a remainder $r_j$ different from the "hand".

Note that, the natural numbers $n_i$ and $m_j$ do not need to have the same values for all the "hands", and may differ for each "hand". In actuality, there is no guarantee that 5k+1, 5k+2, 5k+3, . . . are all prime numbers (for example, at least even numbers are not prime numbers), and hence the natural numbers $n_i$ and $m_j$ need to be changed for each "hand". Further, when the natural numbers $n_i$ and $m_j$ have the same values for all the "hands", the prime factorization of the composite number can easily be performed, also on the grounds of which it is desired to change the natural numbers $n_i$ and $m_j$ for each "hand".

Further, in Expression (1) and Expression (2), the natural number q is set to 5 so that at least four prime numbers in total, in other words, the prime number 1 having three kinds of numbers indicating the "hands" of "rock-scissors-paper" and the prime number 2 different from the prime number 1, can be expressed. Therefore, when "rock-scissors-paper" is used as the determination method for the win-loss outcome, it suffices that the natural number q is at least 5, and the natural number q is not necessarily limited to 5. Further, when "N-deadlock" other than "rock-scissors-paper" having, for example, at least four kinds N of the "hand" is used as the determination method for the win-loss outcome, it suffices that the natural number q is at least N+2.

First Transmission/Reception:

Subsequently, the control operation part of the own vehicle 1*a* multiplies the prime number 1 indicating the "hand" of the own vehicle 1*a* by the prime number 2 different from the prime number 1, and transmits the result to the another vehicle 1*b* as (first composite number)=(prime number 1)×(prime number 2).

Further, the control operation part of the own vehicle 1*a* receives, from the another vehicle 1*b*, (second composite number)=(prime number 3)×(prime number 4) obtained by multiplying the prime number 3 indicating the "hand" of the another vehicle 1*b* by the prime number 4 different from the prime number 3.

At a time point after the first transmission/reception, due to such property that the prime factorization of the composite number of the prime numbers having large numbers of digits is difficult, the own vehicle 1*a* and the another vehicle 1*b* cannot know the prime number 1 and the prime number 3 indicating the another party's "hand" by the prime factorization each other.

Second Transmission/Reception:

Subsequently, the control operation part of the own vehicle 1*a* multiplies the second composite number received in the first transmission/reception by the prime number 2, and transmits the result to the another vehicle 1*b* as (third composite number)=(prime number 3)×(prime number 4)×(prime number 2).

Further, the control operation part of the own vehicle 1*a* receives, from the another vehicle 1*b*, (fourth composite number)=(prime number 1)×(prime number 2)×(prime number 4) obtained by multiplying the first composite number transmitted in the first transmission/reception by the prime number 4.

Acquisition of the "Hand":

At a time point after the second transmission/reception, the control operation part of the own vehicle 1*a* knows the first composite number and the second composite number transmitted/received in the first transmission/reception and the fourth composite number received in the second transmission/reception, and therefore can acquire the prime number 3 indicating the "hand" of the another vehicle 1*b* by the following arithmetic operation:

(first composite number)×(second composite number)/(fourth composite number)=((prime number 1)×(prime number 2))×((prime number 3)×(prime number 4))/((prime number 1)×(prime number 2)×(prime number 4))=(prime number 3)

Further, the control operation part of the another vehicle 1*b* knows the first composite number and the second composite number transmitted/received in the first transmission/reception and the third composite number received in the second transmission/reception, and therefore can acquire the prime number 1 indicating the "hand" of the own vehicle 1*a* by the following arithmetic operation:

(first composite number)×(second composite number)/(third composite number)=((prime number 1)×(prime number 2))×((prime number 3)×(prime number 4))/((prime number 3)×(prime number 4)×(prime number 2))=(prime number 1)

In this manner, the own vehicle 1*a* and the another vehicle 1*b* cannot know the another party's "hand" each other at the time point when the first transmission/reception is performed, or cannot change the "hand" after the first transmission/reception, which allows the "hands" to be exchanged with each other by the method that guarantees such fairness as to allow no foul.

After that, by using the rule of "rock-scissors-paper", the own vehicle 1*a* and the another vehicle 1*b* determine the priority of passage by determining the win-loss outcome from the "hand" of the own vehicle 1*a* and the "hand" of the another vehicle 1*b*. Note that, when the win-loss outcome cannot be determined because both the "hands" are the same, the above-mentioned procedure is repeated until the win-loss outcome is determined.

Note that, it suffices that the prime number 1, the prime number 2, the prime number 3, and the prime number 4 have such numbers of digits as to inhibit the central processing unit that forms the control operation part of the automatic driving control system 10 from performing the prime factorization for (prime number 1)×(prime number 2) and (prime number 3)×(prime number 4) within a time period until the second transmission/reception is performed after the first transmission/reception is performed.

As described above, in the first embodiment, when the automatically driven vehicles face each other on the road, the "hand" for determining the priority of passage is transmitted/received by using the composite number of the prime numbers having large numbers of digits. As a result, it is possible to obtain an automatic driving control system and an automatic driving control method that are capable of exchanging the "hands" by a method that allows no foul.

Note that, the case of using the rule of "rock-scissors-paper" as the determination method for the win-loss outcome of the "hand" has been described above, but the automatic driving control method according to the first embodiment is not necessarily limited to "rock-scissors-paper". For example, "N-deadlock" using at least four kinds N of "hand", "decision by majority" for a case of at least three vehicles, or other such methods can be used.

What is claimed is:

1. An automatic driving control system for a vehicle, comprising:

a central processing unit (CPU) configured to:

in response to receiving data from at least one sensor indicating that the vehicle is facing another vehicle on a road, determine priority of passage on the road between the vehicle and said another vehicle, and in response to the determined priority of passage, control at least one of an accelerator, a brake, and a steering wheel of the vehicle to actuate the vehicle based on the determined priority of passage; and a vehicle to vehicle communication device configured to communicate with a plurality of neighboring vehicles, wherein:

the CPU determines the priority of passage by executing operations comprising:

multiply a first prime number selected from among a group of prime numbers comprising a first number representing a rock hand, a second number representing a scissors hand, and a third number representing a paper hand for the vehicle by a second prime number that is different from the first prime number and is unknown to the another vehicle, and controlling the communication device to transmit a result of the multiplying to the another vehicle as a first composite number, which equals to the first prime number being multiplied by the second prime number, controlling the communication device to receive, from the another vehicle, a second composite number comprising a third prime number being multiplied by a fourth prime number in said another vehicle, the third prime number for the another vehicle selected from among the group of prime numbers and unknown to the vehicle, multiply the received second composite number by the second prime number, and controlling the communication device to transmit a result of the multiplying to the another vehicle as third composite number, which equals to the third prime number being multiplied by the fourth prime number and the second prime number; and controls the communication device to receive, from the another vehicle, a fourth composite number, which equals to the first prime number multiplied by the second prime number and the fourth prime number in the another vehicle;

acquire, from the first composite number, the second composite number, and the fourth composite number, the third prime number by an arithmetic operation:

(first composite number)×(second composite number)/(fourth composite number)=((first prime number)×(second prime number))×((third prime number)×(fourth prime number))/((first prime number)×(second prime number)×(fourth prime number))=(third prime number), and determine the priority of passage between the vehicle and the another vehicle based on a win-loss outcome obtained from the acquired third prime number and the first prime number, wherein the first prime number, the second prime number, the third prime number, and the fourth prime number have numbers of digits to inhibit the CPU from performing prime factorization for the first composite number and the second composite number within a time period while the communication device performs the transmitting and the receiving, wherein the group of prime numbers provide the win-loss outcome.

2. The automatic driving control system according to claim 1, wherein:

the first prime number is assigned to a prime number $p_i$ expressed by Expression (1) so that a remainder obtained by dividing the prime number $p_i$ by a natural number q becomes a value $r_i$ indicating one prime number from among the group of prime numbers:

$$p_i=q\times n_i+r_i \text{ (where } n_i \text{ represents a natural number)} \quad (1);$$

the second prime number is assigned to the prime number $p_i$ expressed by Expression (1) so that the remainder obtained by dividing the prime number $p_i$ by the natural number q becomes a remainder $r_i$ different from the first prime number of the vehicle;

the third prime number 3 is assigned to a prime number $p_j$ expressed by Expression (2) so that a remainder obtained by dividing the prime number $p_j$ by the natural number q becomes a value $r_j$ indicating the second prime number of the another vehicle:

$$p_j=q\times m_j+r_j \text{ (where } m_j \text{ represents a natural number)} \quad (2);$$ and the fourth prime number is assigned to the prime number $p_j$ expressed by Expression (2) so that the remainder obtained by dividing the prime number $p_j$ by the natural number q becomes a remainder $r_j$ different from the second prime number of the another vehicle.

3. The automatic driving control system according to claim 2, wherein:

the automatic driving control system executes a three-deadlock rule of rock-scissors-paper as the determining for the priority of passage for the win-loss outcome obtained from the first prime number and the third prime number, and the natural number q is set to 5.

4. An automatic driving control system according to claim 1, wherein the CPU allows the another vehicle to acquire, from the first composite number and the second composite number and the third composite number, the first prime number for the vehicle by an arithmetic operation comprising:

(first composite number)×(second composite number)/(third composite number)=((first prime number)×(second prime number))×((third prime number)×(fourth prime number))/((third prime number)×(fourth prime number)×(second prime number))=(prime number 1).

5. An automatic driving control method by an automatic driving control system in a vehicle, the method comprising:

receiving, by a communication device in the vehicle, data from at least one sensor indicating that the vehicle is facing another vehicle on a road;

in response to the receiving data indicating that the vehicle is facing said another vehicle, determining, by a central processing unit (CPU) a priority of passage on the road between the vehicle and said another vehicle; and, controlling at least one of an accelerator, a brake, and a steering wheel in the vehicle based on the determined priority of passage, wherein the determining the priority of passage comprises:

multiplying a first prime number selected from among a group of prime numbers comprising a first number representing a rock hand, a second number representing a scissors hand, and a third number representing a paper hand of the vehicle by a second prime number that is different from the first prime number and unknown to the another vehicle, and transmitting a result of said multiplying to the another vehicle as a first composite number, which equals to the first prime number multiplied by the second prime number; and receiving, from the another vehicle, a second composite number, which equals to a third prime number being multiplied by a fourth prime number, the third prime number for the another vehicle selected from among the group of prime numbers and is unknown to the vehicle;

multiplying the received second composite number by the second prime number, and transmitting a result of said multiplying to the another vehicle as a third composite number=(the third prime number)×(the fourth prime number)×(the second prime number); and receiving, from the another vehicle, a fourth composite number=(the first prime number)×(the second prime number)×(the fourth prime number);

acquiring, from the first composite number and the received second composite and the received fourth composite number, the third prime number indicating the second prime number of the another vehicle by an arithmetic operation comprising:

(the first composite number)×(the second composite number)/(the fourth composite number)=((the first prime number)×(the second prime number))×((the third prime number)×(the fourth prime number))/((the first prime number)×(the second prime number)×(the fourth prime number))=(the third prime number); and determining the priority of passage between the vehicle and the another vehicle based on a win-loss outcome obtained from the third prime number and the first prime number, wherein the first prime number, the second prime number, the third prime number, and the fourth prime number, each comprise a number of digits as to inhibit the CPU from performing prime factorization for the first composite number and the second composite number within a time period until the fourth composite number is received, and wherein the group of identifiers provide the win-loss outcome.

6. The method of claim 5, further comprising:

transmitting the first composite number and then the third composite number to the another vehicle, allowing the another vehicle to acquire, from the first composite number and the second composite number and the third composite number, the first prime number by an arithmetic operation comprising:

(first composite number)×(second composite number)/(third composite number)=((first prime number)×(second prime number))×((third prime number)×(fourth prime number))/((third prime number)×(fourth prime number)×(second prime number))=(first prime number 1).

* * * * *